United States Patent Office 3,480,545
Patented Nov. 25, 1969

3,480,545
METHOD OF CONTROLLING THE SPREAD OF FIRES
James W. Dale, Winchester, Mass., assignor to Monsanto Research Corporation, St. Louis, Mo., a corporation of Delaware
No Drawing. Filed Aug. 17, 1966, Ser. No. 572,911
Int. Cl. A62d 1/00
U.S. Cl. 252—2        12 Claims

ABSTRACT OF THE DISCLOSURE

A method for controlling the spread of fire which involves applying to an ignited or ignitable object, a viscoelastic, flame inhibiting gel composition having a halogenated hydrocarbon and a gelling amount of a mixture of aluminum soaps as the essential ingredients thereof.

---

This invention relates to fire extinguishing agents, and more particularly provides novel fire extinguishing gel compositions of high density and methods of applying the same.

It is well established that in many cases preflame and flame reactions involve radicals and are chain reactions. Chemical inhibition of fire, therefore, is believed to be associated with the ability of the compound to dissociate at certain critical temperatures, producing free radicals. These radicals presumably enter into the combustion process and terminate the chain reactions. Certain halogen-containing hydrocarbons are known to be effective as flame-inhibiting agents: this is believed to be because of their ability to form radicals. Methods of delivering these halogenated hydrocarbons to burning surfaces are, however, deficient. The volatile and non-adhering nature of these flame inhibitors makes their efficient delivery to vertical burning surfaces especially difficult.

Gelled compositions have been known which cling readily to vertical surfaces and form contoured coatings over the exposed surfaces of the inflammable material. The gelled compositions which have been previously provided for use as fire extinguishing agents, however, extinguish flames primarily by physical mechanisms and fail to incorporate highly efficient chemical flame inhibitors.

There is in the prior art a fire extinguishing system which incorporates halogenated hydrocarbons into a foam. The production of the foam in this system requires an aqueous solution and consequently excessive care must be exercised if a homogeneous dispersion of the halogenated hydrocarbon is to be obtained. In addition to being difficult to prepare, the foamed system is runny and watery and will not adhere to vertical walls in a stationary position in appreciable thickness when heat is present, whereas a viscoelastic gel material will.

It is an object of this invention to provide new and useful high density, viscoelastic gel compositions which are comprised of a mixture of one or more non-metallic halide flame inhibitors and a gelling amount of a metallic soap.

Another object of this invention is to provide new and useful viscoelastic gel compositions comprised of a mixture of one or more per- or poly-halogenated aliphatic flame inhibitors and a metallic soap gelling agent.

Another object of this invention is to provide a novel method for extinguishing fires which enables the operator of the apparatus to be located at a safer distance from the ignited object than is generally possible when conventional fire extinguishing agents are employed.

Another object of this invention is to provide high density, viscoelastic flame inhibiting gel compositions which adhere to both the vertical and horizontal surfaces of an object.

These and other objects of this invention will become apparent as a detailed description of the invention proceeds.

According to the invention, there are prepared novel fire extinguishing gel compositions which are prepared by mixing halogenated saturated or olefinicially unsaturated aliphatic flame inhibitors with a suitable metallic soap gelling agent.

The presently provided novel compositions are generally stable, well defined products which upon discharge from an ejection apparatus emerge in the form of an elongated rod rather than as a spray. When contact with the burning object is made, the gel forms a coating over the burning surface. The novel gel composition is observed to adhere to both the vertical and horizontal surfaces of the object. Because of the high density and the viscoelastic character of the novel gel compositions, an ejection apparatus containing a quantity of gel composition as provided by this invention may be employed in such a way as to permit the operator of the apparatus to be located at a safer distance from the ignited object than is generally possible when conventional fire extinguishing agents are employed.

The presently employed flame inhibitors are halogenated saturated and halogenated olefinicially unsaturated aliphatic flame inhibitors of from 1–3 carbon atoms and free of acetylenic unsaturation. There are shown below a number of useful halogenated flame inhibitors. It is not intended that this be a complete listing of all the useful halogenated carbon compounds, but that it merely be illustrative thereof: carbon tetrachloride, bromodichloromethane, 1,1,2,2 - tetrabromoethane, fluorotribromomethane, dibromodifluoromethane, dichloromethane, 1,1,2,2-tetrachloroethane, 1,1,1-trichloro-2,2,2 - trifluoroethane, 1,1,2,2-tetrafluoro-1,2-diiodoethane, 1,1,1-trifluoro - 2,2-fluoro - 2 - iodoethane, 1,1,1 - trifluoro-2 - bromopropane, 1 - bromo - 2,2 - difluoropropane, 1,1 - dichloro - 2 - bromoethylene, 1,1 - difluoro - 2-bromoethylene, 1,1 - dibromo - 2 - fluoroethylene, tetrachloroethylene, and so forth.

A variety of gelling agents may be used to prepare the presently provided novel compositions. The most suitable gels for the purposes of this invention, however, are prepared from napalm soaps. Napalm soaps can be considered as compounded from two components. One component is Al laurate or a saturated fatty acid soap containing at least 40–50% of this substance or a functionally related acid soap of from 8 to 20 carbon atoms such as aluminum tridecylate, Al caprylate, Al pelargonate, Al caprate, Al undecylate, Al myristate, Al pentadecylate, Al palmitate, Al margarate, Al stearate, Al nonadecylate, etc. Al laurate (also known as Al dodecanoate) is, however, the preferred component. This first component of napalm as described above is a relatively high-melting solid that, by itself, produces only thin and unstable gels. The second component is an aluminum soap of an acid selected from the group including naphthenic acid and unsaturated fatty acids of from 15 to 20 carbon atoms—such as, aluminum naphthenate, oleate, oleate-linolenate, linoleate, linolelaidate, liragonate, elestearate, punicate, linolenate, palmitoleate, petroselinate, elaidate, gadoleate, etc. A mixture of the oleate and naphthenate is the preferred composition for this second component of napalm. By itself, the aluminum soap comprising the second component is either a resinous gum or a low melting solid, and most soaps of this type yield gels only by heat treatment or by special processing. The combination of aluminum laurate or the aluminum soap of coconut fatty acid containing 40–50% laurate with an Al naphthenate-oleate mixture gives a thickening agent of distinctive and superior properties not found in either component alone and is the composition preferred for this invention. The above description is not intended to limit the composition of napalm type gelling agents.

Other substances which may be used as gelling agents include, for example, a mixture of metallic soaps of the type previously described but wherein the metal ion may be Mg, Ca, Ba, Mn, Fe, Co, Ni, Al, Zn, Cd, etc.

In carrying out the process of this invention, the desired halogenated carbon compound is simply mixed with the gelling agent until a viscoelastic gel is formed. Suitable gel compositions may be prepared under a wide variety of conditions. Ambient temperatures are suitable for preparing the gel composition, although temperatures ranging from below 0° C. to just below the boiling point of the flame inhibitors may be used. The aluminum soaps may be used at concentrations ranging from 2 to 10% by weight, although a concentration range of from 3 to 6% by weight is preferred. Neither solvents nor catalysts are required for the preparation of the compositions. The time required for gelation in general will depend on the nature of the ingredients employed, the concentration of gelling agents and the temperature at which the ingredients are mixed. Ordinarily gelation will occur in a time range of from several seconds to several hours. Atmospheric pressure is satisfactory for preparing the gel compositions, though elevated pressures may be desirable when volatile compounds are being used. The gels may be conveniently stored before use.

The presently provided gel compositions of the invention are applied for fire extinguishing uses by discharge from any pumper, auxiliary pumping apparatus, or portable extinguisher capable of operating at a sufficient pressure. The gel is extruded from the apparatus in the form of an elongated rod which upon impact with an ignited or ignitable object spreads out to form a fire extinguishing coating on the surfaces of the object. Extrusion pressures are generally determined by the type of fire extinguishing apparatus, the viscosity of the gel and the distance of the apparatus from the fire. In general pressures for extruding the gel compositions range from about 100 p.s.i. to about 5,000 p.s.i.

The invention is illustrated but not limited by the following examples:

EXAMPLE I

This example illustrates the preparation of a novel fire extinguishing gel composition in accordance with this invention. To 1262 grams (g.) [about 470 milliliters (ml.)] of fluorotribromomethane is added, at ambient temperature with stirring, 50 g. of a napalm gelling agent (a co-precipitated Al soap of 65 percent oleic acid, 5 percent naphthenic acid, and 30 percent coconut fatty acid). Stirring time is about thirty minutes and stirring is accomplished in a tumbling device. The composition is then allowed to stand and a viscoelastic gel is formed within three hours. The rheological properties of the gel thus formed are found to enable the gel to be projected for long distances (150 feet) as a coherent rod. The gel also exhibits excellent adhesion to vertical surfaces.

The following examples further illustrate the preparation of a novel fire extinguishing gel composition in accordance with this invention.

EXAMPLE II 974 g. (about 470 ml.) of bromodichloromethane and 40 g. of the metallic soap gelling agent described in Example I are mixed together, according to the procedure of Example I, to form a viscoelastic gel.

EXAMPLE III 893 g. (about 470 ml.) of bromochloromethane and 28 g. of the metallic soap gelling agent described in Example I are mixed together according to the method of Example I, to form a viscoelastic gel.

EXAMPLE IV 625 g. (about 470 ml.) of dichloromethane and 30 g. of the metallic soap gelling agent described in Example I are mixed together according to the method of Example I, to form a viscoelastic gel.

EXAMPLE V 750 g. (about 470 ml.) of carbon tetrachloride and 35 g. of the metallic soap gelling agent described in Example I are mixed together according to the method of Example I, to form a viscoelastic gel.

EXAMPLE VI 750 g. (about 470 ml.) of 1,1,2,2-tetrachloroethane and 35 g. of the metallic soap gelling agent described in Example I are mixed together according to the method of Example I, to form a viscoelastic gel.

EXAMPLE VII 761 g. (about 470 ml.) of tetrachloroethylene and 40 g. of the metallic soap gelling agent described in Example I are mixed together according to the method of Example I, to form a viscoelastic gel.

EXAMPLE VIII

A mixture consisting of 1385 g. (about 470 ml.) of 1,1,2,2-tetrabromoethane and 750 g. (about 470 ml.) of carbon tetrachloride are mixed with 105 g. of the metallic soap gelling agent described in Example I according to the method of Example I, to form a viscoelastic gel.

EXAMPLE IX

This example further illustrates the preparation of a novel fire extinguishing gel composition, comprising a mixture of flame inhibitors and a gelling agent, in accordance with this invention.

A mixture consisting of 1262 g. (about 470 ml.) of fluorotribromomethane and 750 g. (about 470 ml.) of carbon tetrachloride are mixed with 85 g. of the metallic soap gelling agent described in Example I according to the method of Example I, to form a viscoelastic gel.

EXAMPLE X

This example illustrates a method for extinguishing fires employing the novel composition as provided by this invention which consists in discharging an elongated rod of gel compositions from an ejection apparatus at a burning object.

To test novel nonaqueous fire extinguishing gel compositions, an ejection apparatus is loaded with a quantity of the product of Example I, comprised substantially of 1262 g. of fluorotribromomethane and 50 g. of the metallic soap gelling agent described in Example I. The apparatus is then brought to a pressure of 300 p.s.i. and discharged at a burning object located at a distance of about 50 yards. The barrel of the gun is elevated only a few degrees above horizontal in order to achieve an essentially flat trajectory for the extruded rod. When the apparatus is fired, the gel composition emerges in the form of an elongated rod having roughly the diameter of the inside bore of the gun's discharge barrel (about ¼ of an inch). The gel composition maintains its rod-like form during flight until contact is made with the surface of the burning object. The rod of gel upon impact with the object, spreads out and forms a coating over the burning surfaces of the object. Upon application, of the coating to the surfaces of the burning object, the fire is readily extinguished. The coating formed by the novel gel composition is observed to adhere to both the vertical and horizontal surfaces of the burning object.

The products of Example II through IX inclusive, when tested in the manner of Example X, produce similar extruded gelled rods and are similarly effective as fire extinguishing substances.

What is claimed is:

1. A method for controlling the spread of fire which comprises the step of applying to an ignited or ignitable object in the proximity of said fire, a composition consisting essentially of a halogenated hydrocarbon of from 1 to 3 carbon atoms and a gelling amount of an aluminum soap consisting essentially of a mixture of aluminum soaps chosen from the group consisting of aluminum soaps of saturated fatty acids of from 8 to 20 carbon atoms, aluminum soap of napthenic acid and aluminum soaps of unsaturated fatty acids of from 15 to 20 carbon atoms.

2. The method of claim 1 wherein said hydrocarbon is fluorotribromomethane.

3. The method of claim 1 wherein said hydrocarbon is bromodichloromethane.

4. The method of claim 1 wherein said hydrocarbon is 1,1,2,2-tetrachloroethane.

5. The method of claim 1 wherein said hydrocarbon is dichloromethane.

6. The method of claim 1 wherein said hydrocarbon is bromochloromethane.

7. The method of claim 1 wherein said hydrocarbon is a mixture of about equal volumes of carbon tetrachloride and a material selected from the group consisting of fluorotribromoethane and 1,1,2,2-tetrabromoethane.

8. The method of claim 1 wherein said hydrocarbon is 1,1,1-trichloro-2,2,2-trifluoroethane.

9. The method of claim 1 wherein said hydrocarbon is a halogenated carbon compound of from 1 to 3 carbon atoms having olefinic unsaturation.

10. The method of claim 1 wherein said hydrocarbon is tetrachloroethylene.

11. The method of claim 1 wherein said aluminum soap is a coprecipitated aluminum soap of a mixture of 65 percent oleic acid, 5 percent naphthenic acid, and 30 percent coconut fatty acid.

12. The method of claim 1 in which said hydrocarbon is fluorotribromomethane and said aluminum soap is a coprecipitated aluminum soap of 65 percent oleic acid, 5 percent naphthenic acid, and 30 percent coconut fatty acid.

References Cited

UNITED STATES PATENTS

| | | | |
|---|---|---|---|
| 1,926,395 | 9/1933 | Midgley | 252—3 XR |
| 2,021,981 | 11/1935 | Bichousky | 252—8 XR |
| 2,390,609 | 12/1948 | Minich | 252—316 |
| 2,620,345 | 12/1952 | Dean | 252—316 XR |
| 2,618,536 | 11/1952 | Hunn | 252—316 XR |
| 2,626,897 | 1/1953 | Young et al. | 202—316 XR |
| 2,668,419 | 2/1954 | Kapes | 202—8 XR |
| 3,106,530 | 10/1963 | Glew | 202—8 |
| 3,196,108 | 7/1965 | Nelson | 202—2 XR |
| 3,229,769 | 1/1966 | Bashaw et al. | 252—26 XR |
| 3,276,999 | 10/1966 | Petit et al. | 252—8 |
| 3,356,610 | 12/1967 | Maestre et al. | 252—8 |

MAYER WEINBLATT, Primary Examiner

U.S. Cl. X.R.

117—137; 169—1; 252—3, 8, 305, 316